(12) United States Patent
Lim et al.

(10) Patent No.: US 12,456,724 B2
(45) Date of Patent: Oct. 28, 2025

(54) IRREVERSIBLE ADDITIVE, POSITIVE ELECTRODE MATERIAL INCLUDING IRREVERSIBLE ADDITIVE, AND LITHIUM SECONDARY BATTERY INCLUDING POSITIVE ELECTRODE MATERIAL

(71) Applicant: LG Energy Solution, Ltd., Seoul (KR)

(72) Inventors: Sung Chul Lim, Daejeon (KR); Min Chul Jang, Daejeon (KR); In Sung Uhm, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 753 days.

(21) Appl. No.: 17/774,070

(22) PCT Filed: Nov. 11, 2020

(86) PCT No.: PCT/KR2020/015729
§ 371 (c)(1),
(2) Date: May 3, 2022

(87) PCT Pub. No.: WO2021/096204
PCT Pub. Date: May 20, 2021

(65) Prior Publication Data
US 2022/0393156 A1 Dec. 8, 2022

(30) Foreign Application Priority Data

Nov. 11, 2019 (KR) .................. 10-2019-0143768

(51) Int. Cl.
*H01M 4/36* (2006.01)
*H01M 4/02* (2006.01)
(Continued)

(52) U.S. Cl.
CPC ........... *H01M 4/366* (2013.01); *H01M 4/134* (2013.01); *H01M 4/505* (2013.01); *H01M 4/525* (2013.01);
(Continued)

(58) Field of Classification Search
CPC ...... H01M 4/366; H01M 4/134; H01M 4/505; H01M 4/525; H01M 4/582;
(Continued)

(56) References Cited

U.S. PATENT DOCUMENTS

| 5,783,333 A | 7/1998 | Mayer |
| 6,007,947 A | 12/1999 | Mayer |

(Continued)

FOREIGN PATENT DOCUMENTS

| CN | 1745490 A | 3/2006 |
| CN | 108511697 A | 9/2018 |

(Continued)

OTHER PUBLICATIONS

Zhang, Linghong, et al. "Mitigating the initial capacity loss and improving the cycling stability of silicon monoxide using Li5FeO4." Journal of Power Sources 400 (2018): 549-555. (Year: 2018).*

(Continued)

*Primary Examiner* — Matthew T Martin
*Assistant Examiner* — Grace Ann Kenlaw
(74) *Attorney, Agent, or Firm* — Lerner David LLP (57) ABSTRACT

An irreversible additive includes an oxide having a trigonal crystal structure and represented by Formula 1, and a coating layer positioned on a surface of the oxide and including a compound represented by Formula 2. A positive electrode material including the irreversible additive and a lithium secondary battery including the positive electrode material including the irreversible additive are also provided.

15 Claims, 5 Drawing Sheets

(51) Int. Cl.
    *H01M 4/134*     (2010.01)
    *H01M 4/505*     (2010.01)
    *H01M 4/525*     (2010.01)
    *H01M 4/58*     (2010.01)
    *H01M 10/0525*     (2010.01)

(52) U.S. Cl.
    CPC ....... *H01M 4/582* (2013.01); *H01M 10/0525* (2013.01); *H01M 2004/027* (2013.01); *H01M 2004/028* (2013.01)

(58) Field of Classification Search
    CPC ....... H01M 10/0525; H01M 2004/028; H01M 4/131; H01M 10/4235
    See application file for complete search history.

(56) References Cited

U.S. PATENT DOCUMENTS

| | | |
|---|---|---|
| 2004/0157124 A1 | 8/2004 | Goh et al. |
| 2005/0118496 A1 | 6/2005 | Chang et al. |
| 2010/0203386 A1 | 8/2010 | Chang et al. |
| 2013/0011727 A1 | 1/2013 | Chang et al. |
| 2014/0315078 A1 | 10/2014 | Chang et al. |
| 2016/0064733 A1 | 3/2016 | Aso |
| 2017/0069907 A1 | 3/2017 | Zhu et al. |

FOREIGN PATENT DOCUMENTS

| | | |
|---|---|---|
| JP | 2017168323 A | 9/2017 |
| KR | 100612089 B1 | 8/2006 |
| KR | 100838944 B1 | 6/2008 |
| KR | 20160131069 A | 11/2016 |
| KR | 20190078392 A | 7/2019 |
| KR | 20190124038 A | 11/2019 |
| WO | 2005031892 A2 | 4/2005 |

OTHER PUBLICATIONS

Kuganathan, Navaratnarajah, Poobalasuntharam Iyngaran, and Alexander Chroneos. "Lithium diffusion in Li5FeO4." Scientific reports 8.1 (2018): 5832. (Year: 2018).*

Back, Chang Keun, et al. "Electrochemical properties and gas evolution behavior of overlithiated Li2NiO2 as cathode active mass for rechargeable Li ion batteries." Journal of the Electrochemical Society 159.6 (2012): A887. (Year: 2012).*

Kim, Un-Hyuck, et al. "Quaternary layered Ni-rich NCMA cathode for lithium-ion batteries." ACS energy letters 4.2 (2019): 576-582. (Year: 2019).*

International Search Report for Application No. PCT/KR2020/015729 dated Feb. 24, 2021, 2 pages.

Kim, M et al., "Air stable Al2O3-coated Li2NiO2 cathode additive as a surplus current consumer in a Li-ion cell", "Journal of Materials Chemistry", 2008, pp. 5880-5887, vol. 18.

Lee, H et al., "Li2NiO2 as a Novel Cathode Additive for Overdischarge Protection of Li-Ion Batteries", "Chemistry of Materials", Aug. 2008, pp. 5-7, vol. 20.

Ruther, R et al., "Synthesis, Structure, and Electrochemical Performance of High Capacity Li2Cu0.5Ni0.5O2 Cathodes", "Chemistry of Materials", 2015, pp. 6746-6754, vol. 27.

Davidson, I. et al., "Structure of 1T-Li2NiO2 from powder neutron diffraction", Solid State Ionics, Jul. 1, 1991, pp. 243-247, vol. 46.

Search Report dated Aug. 20, 2024 from the Office Action for Chinese Application No. 202080076025.3 issued Aug. 24, 2024, 3 pages.

Extended European Search Report including Written Opinion for Application No. 20886666.5 dated Oct. 13, 2022, pp. 1-7.

Min, K. et al., "Computational Screening for Design of Optimal Coating Materials to Suppress Gas Evolution in Li-Ion Battery Cathodes", Applied Materials & Interfaces, May 5, 2017 (May 5, 2017), pp. 17822-17834, vol. 9. XP055920717.

* cited by examiner

IRREVERSIBLE ADDITIVE, POSITIVE ELECTRODE MATERIAL INCLUDING IRREVERSIBLE ADDITIVE, AND LITHIUM SECONDARY BATTERY INCLUDING POSITIVE ELECTRODE MATERIAL

CROSS-REFERENCE TO RELATED APPLICATIONS

This application is a national phase entry under 35 U.S.C. § 371 of International Application No. PCT/KR2020/015729, filed on Nov. 11, 2020, which claims priority to Korean Patent No. 10-2019-0143768, filed on Nov. 11, 2019.

TECHNICAL FIELD

The present invention relates to an irreversible additive, a positive electrode material for a lithium secondary battery including the irreversible additive, and a lithium secondary battery including the positive electrode material.

BACKGROUND ART

As technology development and demand for mobile devices have increased, the demand for secondary batteries as an energy source has been rapidly increased. Among such secondary batteries, lithium secondary batteries having high energy density and operating potential, long cycle life, and low self-discharging rate have been commercialized and widely used.

A lithium secondary battery is generally composed of a positive electrode including a positive electrode active material, a negative electrode including a negative electrode active material, a separator, and an electrolyte, and is a secondary battery charged and discharged by the intercalation-de-intercalation of lithium ions. A lithium secondary battery has advantages of having high energy density, high electromotive force, and high capacity, and thus is applied in various fields.

Various methods have been studied to implement lithium secondary batteries having a higher capacity. Specifically, a method has been attempted in which one or two or more materials such as LCO, LNMCO, LMO, and the like are used as a positive electrode active material included in a positive electrode for a lithium secondary battery to implement a high-capacity lithium secondary battery. However, in order to increase the capacity of a lithium secondary battery, not only the capacity of a positive electrode, but also the capacity of a negative electrode needs to be increased. To this end, a method has also been attempted in which a silicon-based negative electrode active material having a high capacity is used as a negative electrode. However, in the case of a battery in which such a silicon-based negative electrode active material is used, an electrolyte is decomposed during initial charging, resulting in forming a solid electrolyte interface (SEI) layer on the surface of the negative electrode active material, so that there is an irreversible capacity generated accordingly. Due to the generation of the irreversible capacity, energy density is decreased, so that there is a problem in that a secondary battery is not sufficiently used up to its theoretical capacity.

Therefore, $Li_2NiO_2$ has typically been added a sacrificial positive electrode material in order to solve the problem of an irreversible capacity due to the pre-lithiation of a negative electrode.

However, although $Li_2NiO_2$, which is typically used as a sacrificial positive electrode material, has an orthorhombic structure and has an Immm space group, there is a structural change thereof in 3 stages in an available voltage range after initial charging, which causes side reactions such as impurities generation, gas generation, and the like. Specifically, after the initial charging, $Li_2NiO_2$ maintains the orthorhombic structure and the Immm space group at 3.0 V to 3.5 V, and the structure thereof transforms into a trigonal structure at 3.5 V to 4.0 V, and transforms into a monoclinic structure at 4.0 V to 4.25 V, resulting in causing a problem due to the structural change thereof.

Therefore, there has been a demand for the development of an additive which allows lithium ions to be sufficiently expressed during initial charging, and which does not cause impurities generation or gas generation according to the structural change in an available voltage range in the following charging and discharging.

DISCLOSURE OF THE INVENTION

Technical Problem

In order to solve the above problem, a first aspect of the present invention provides an irreversible additive capable of minimizing a structural change within an available voltage range during charging and discharging, and suppressing gas generation and a side reaction on a surface by a coating layer present on the surface.

A second aspect of the present invention provides a positive electrode material for a secondary battery including the irreversible additive.

A third aspect of the present invention provides a lithium secondary battery including the positive electrode material.

Technical Solution

According to an aspect of the present invention, there is provided an irreversible additive including an oxide having a trigonal crystal structure and represented by Formula 1 below, and a coating layer positioned on the surface of the oxide represented by Formula 1 and including a compound represented by Formula 2 below.

$$Li_{2+a}Ni_{1-b}M1_bO_{2+c} \qquad \text{[Formula 1]}$$

In Formula 1 above, $0 \leq a \leq 0.2$, $0 \leq b \leq 0.5$, and $0 \leq c \leq 0.2$, and M1 is one or more selected from the group consisting of Cu, Mg, Pt, Al, Co, P, and B.

$$Li_{5+c}FeO_{4-d}A_d \qquad \text{[Formula 2]}$$

In Formula 2 above, $0 \leq c \leq 0.2$ and $0 \leq d \leq 0.5$, preferably $0 \leq c \leq 0.1$ and $0 \leq d \leq 0.2$, and A is one or more selected from the group consisting of F, Cl, Br, I, At, and S.

According to another aspect of the present invention, there is provided a positive electrode material including the irreversible additive and a positive electrode active material, and a lithium secondary battery including the positive electrode material.

Advantageous Effects

An irreversible additive according to the present invention includes a lithium nickel oxide having a trigonal crystal structure, and thus, minimizes the crystal structural change of the irreversible additive within a secondary battery driving voltage range, so that the structural deterioration of the irreversible additive may be suppressed during charging/discharging.

In addition, the irreversible additive according to the present invention has a coating layer formed on the surface of the lithium nickel oxide, the coating layer having an orthorhombic structure and including a compound serving as LISICON, thereby stabilizing the structure of the trigonal lithium nickel oxide, increasing lithium ion mobility, and minimizing the contact between an electrolyte solution and the lithium nickel oxide.

As a result, compared to a typical irreversible additive including an orthorhombic lithium nickel oxide, the irreversible additive according to the present invention has excellent structural stability, and may also significantly reduce gas generation and lithium by-product generation caused by a side reaction with the electrolyte solution.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

BEST MODE FOR CARRYING OUT THE INVENTION

Hereinafter, the present invention will be described in more detail.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

Irreversible Additive

The present inventors have found that when a lithium nickel oxide having a specific crystal structure, specifically a trigonal crystal structure, is used as an irreversible additive, the structural change of the irreversible additive during charging and discharging may be suppressed, and when a lithium super ionic conductor(LISICON)-based compound is coated on the surface thereof, the structural stability of the trigonal lithium nickel oxide may be increased and the mobility of lithium ions during initial charging and discharge may be improved, thereby effectively compensate an irreversible capacity of a negative electrode, and have completed the present invention.

Specifically, an irreversible additive according to the present invention includes a lithium nickel oxide having a trigonal crystal structure and represented by Formula 1 below, and a coating layer positioned on the surface of the lithium nickel oxide represented by Formula 1 and including a compound represented by Formula 2 below.

$$Li_{2+a}Ni_{1-b}M1_bO_{2+c}$$ [Formula 1]

In Formula 1 above, 0≤a≤0.2, 0≤b≤0.5, and 0≤c≤0.2, and M1 is one or more selected from the group consisting of Cu, Mg, Pt, Al, Co, P, and B.

$$Li_{5+c}FeO_{4-d}A_d$$ [Formula 2]

In Formula 2 above, 0≤c≤0.2, and 0≤d≤0.5, preferably 0≤c≤0.1 and 0≤d≤0.2, and A is one or more selected from the group consisting of F, Cl, Br, I, At, and S.

Figure 1:
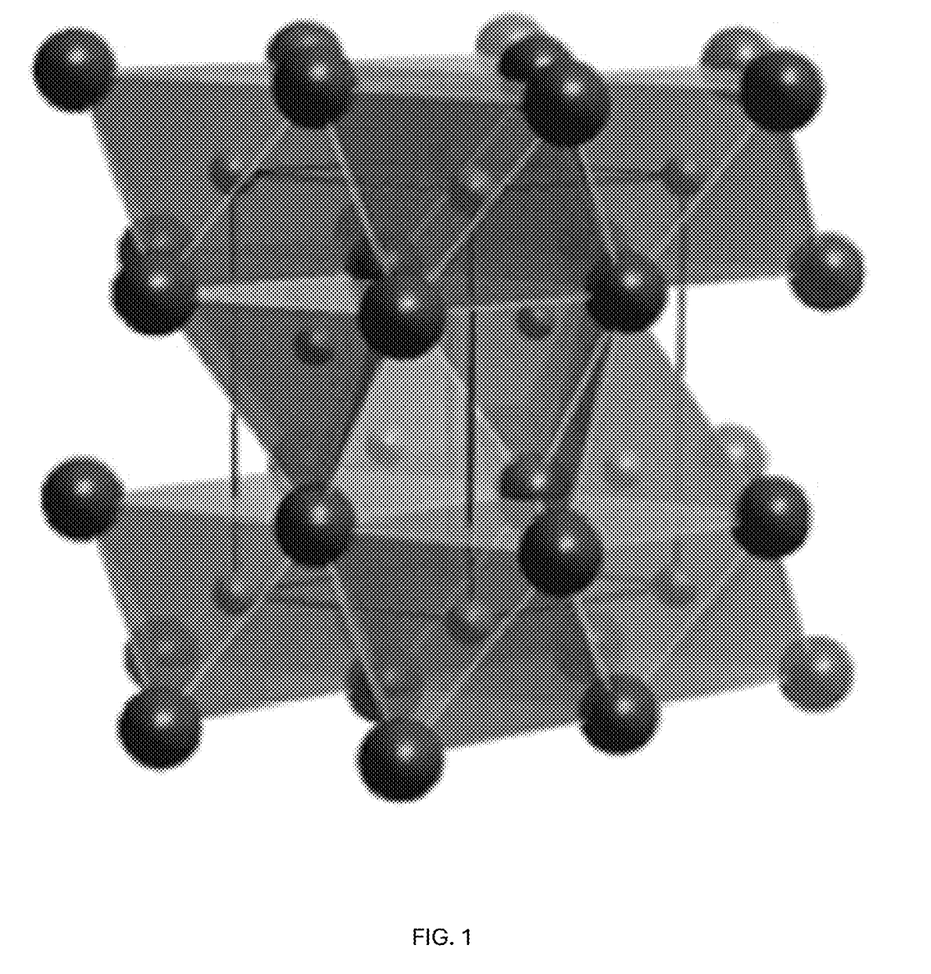
FIG. 1 illustrates a schematic view of a lithium nickel oxide having a trigonal crystal structure whose space group belongs to P3-m1.

FIG. 1 illustrates a schematic view of a lithium nickel oxide having a trigonal crystal structure whose space group belongs to P3-m1.

A trigonal crystal structure means that three axes in a crystal have the same length, and angles between each axis are also the same, while being different from 90°. Specifically, the trigonal crystal structure represents a=b=c and ∠α=∠β=∠γ≠90°. An oxide having the crystal structure as described above may reversibly intercalate and de-intercalate lithium ions, and since the crystal structure has a two-dimensional layered structure, ion diffusion may rapidly occur.

Specifically, the lithium nickel oxide may be represented by Formula 1 below.

$$Li_{2+a}Ni_{1-b}M1_bO_{2+c}$$ [Formula 1]

In Formula 1 above, 0≤a≤0.2, 0≤b≤0.5, and 0≤c≤0.2, and M1 is one or more selected from the group consisting of Cu, Mg, Pt, Al, Co, P, and B.

The lithium nickel oxide represented by Formula 1 above may include lithium and nickel in a molar ratio of 1.5:1 to 2:1, preferably 1.8:1 to 2:1, most preferably 2:1. Preferably, the oxide represented by Formula 1 above may be $Li_2NiO_2$. When the molar ratio of lithium and nickel satisfies the above range, the formation of a trigonal crystal structure may be stably achieved.

A lithium nickel oxide typically used as an irreversible additive is commonly known to be formed in an orthorhombic crystal structure. However, when preparing a lithium nickel oxide, if the lithium nickel oxide is synthesized by mixing in a molar ratio of lithium:nickel(Li/Ni) of 2 or greater and/or by reacting $LiNiO_2$ and a lithium raw material in a wet manner in an inert atmosphere, a lithium nickel oxide having a trigonal structure may be prepared.

Meanwhile, a lithium nickel oxide having an orthorhombic structure may undergo a structural change of at least three stages within an available voltage range of a secondary battery. Specifically, the lithium nickel oxide maintains an orthorhombic structure within a voltage range of 3.0 V to 3.5 V, and with an increase in voltage, transforms into a trigonal structure within a voltage range of 3.5 V to 4.0 V due to the de-intercalation of lithium ions, and thereafter, transforms into a monoclinic structure within a voltage range of 4.0 V to 4.25 V as lithium is further de-intercalated. When the structural change of at least three stages occurs as described above, the structural stability of the lithium nickel oxide is degraded due to the structural transformation, which may cause a problem of lithium by-product generation, gas generation, or the like.

On the contrary, in the case of a lithium nickel oxide having a trigonal structure, the oxide does not participate in a reaction at a voltage lower than 3.5 V, maintains the trigonal structure within a voltage range of 3.5 V to 4.0 V, and with an increase in voltage, transforms into a monoclinic structure, which belongs to a C2/m space group, within a voltage range of 4.0 V to 4.25 V due to the de-intercalation of lithium ions. Therefore, compared to a case in which a lithium nickel oxide having an orthorhombic structure is used, when a lithium nickel oxide having a trigonal structure is used as in the present invention, there is less crystal structural transformation during a charging/discharging process, so that the degradation in structural stability due to the crystal structural transformation may be minimized.

In addition, the irreversible additive of the present invention includes a coating layer having a compound represented by Formula 2 on the surface of the lithium nickel oxide of Formula 1 having a trigonal crystal structure.

$$Li_{5+c}FeO_{4-d}A_d$$ [Formula 2]

In Formula 2 above, $0 \leq c \leq 0.2$ and $0 \leq d \leq 0.5$, preferably $0 \leq c \leq 0.1$ and $0 \leq d \leq 0.2$, and A includes one or more selected from the group consisting of F, Cl, Br, I, At, and S. Most preferably, the compound represented by Formula 2 above may be $Li_5FeO_4$.

The compound represented by Formula 2 above is a LISICON-based compound having a high lithium ion conductivity, and thus, when the surface of the lithium nickel oxide represented by Formula 1 is coated with the compound of Formula 2 above, lithium ion mobility is increased to more effectively achieve the compensation for an irreversible capacity of a negative electrode during initial charging (an activation process).

Also, when the surface of the lithium nickel oxide is coated with the compound of Formula 2 above, the surface structure is stabilized by the compound of Formula 2 above, so that the irreversible additive may be prevented from rapid structural deterioration, and the lithium nickel oxide and an electrolyte solution are prevented from being in direct contact with each other, so that gas generation and lithium by-product generation due to a side reaction with the electrolyte solution may be effectively suppressed.

Meanwhile, the compound of Formula 2 above has an orthorhombic crystal structure, and may exhibit a Pbca space group.

Figure 2:
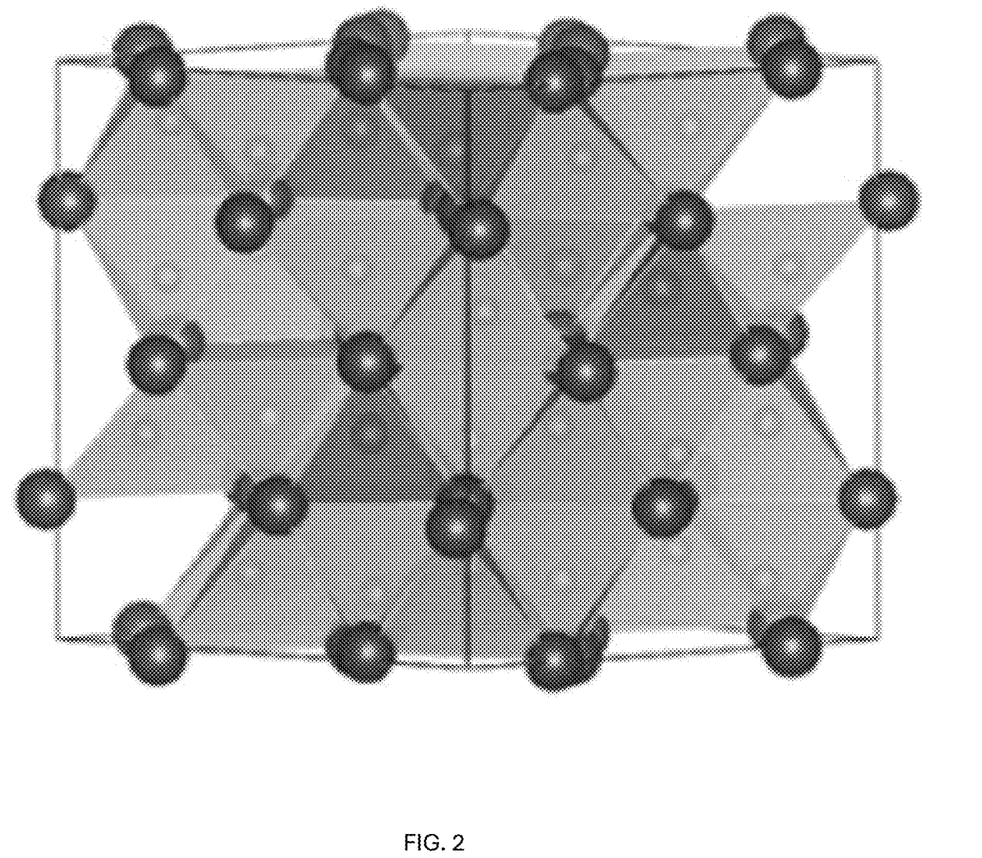
FIG. 2 illustrates a schematic view of a compound of a LISICON structure having an orthorhombic crystal structure whose space groups belongs to Pbca.

FIG. 2 illustrates a schematic view of a compound having an orthorhombic crystal structure whose space groups belongs to Pbca.

The orthorhombic crystal structure whose space group belongs to Pbca means a crystal structure having three orthogonal crystal axes, wherein each axis has a different length from each other, and having a dyad symmetry axis parallel to a main axis. Specifically, the orthorhombic crystal structure represents $a \neq b \neq c$ and $\angle \alpha = \angle \beta = \angle \gamma = 90°$, and lattice parameters of the present invention represent 9.2 Å<a<9.3 Å, 9.2 Å<b<9.3 Å, and 9.1 Å<c<9.2 Å, preferably 9.2 Å<a<9.25 Å, 9.2 Å<b<9.25 Å, and 9.1 Å<c<9.15 Å, most preferably a=9.2180 Å, b=9.2130 Å, and c=9.1590 Å.

Meanwhile, the irreversible additive according to the present invention may include the compound represented by Formula 2 above in an amount of 1 to 10 parts by weight, preferably 1 to 5 parts by weight based on a total weight of 100 parts by weight of the lithium nickel oxide represented by Formula 1 above. When the content of the compound of Formula 2 satisfies the above range, the generation of a surface side reaction may be suppressed while minimizing the degradation in irreversible capacity.

Meanwhile, the coating layer may be uniformly distributed across the entire surface of the lithium nickel oxide represented by Formula 1 above, or may be distributed in a partially aggregated island form.

Positive Electrode Material

In addition, the present invention provides a positive electrode material for a lithium secondary battery, the positive electrode material including the above-described irreversible additive and a positive electrode active material.

The irreversible additive has already been described. Therefore, the positive electrode active material will be described hereinafter.

Any material typically used as a positive electrode active material may be applied as the positive electrode active material without particular limitation. Specific examples thereof may be a layered compound such as a lithium cobalt oxide ($LiCoO_2$) and a lithium nickel oxide ($LiNiO_2$), or a compound substituted by one or more transition metals; a lithium manganese oxide represented by Formula $Li_{1-y1}Mn_{2-y1}O_4 (0 \leq y \leq 10.33)$, $LiMnO_3$, $LiMn_2O_3$, or $LiMnO_2$; a lithium copper oxide ($Li_2CuO_2$); a vanadium oxide such as $LiV_3O_8$, $LiFe_3O_4$, $V_2O_5$, and $Cu_2V_2O_7$; a Ni-site type lithium nickel oxide represented by Formula $LiNi_{1-y2}M_{y2}O_2$ (wherein M is one or more selected from the group consisting of Co, Mn, Al, Cu, Fe, Mg, B, and Ga, and $0.01 \leq y2 \leq 0.3$); a lithium manganese complex oxide represented by Formula $LiMn_{2-y3}M_{y3}O_2$ (wherein M is one or more selected from the group consisting of Co, Ni, Fe, Cr, Zn, and Ta, and $0.01 \leq y3 \leq 0.1$) or Formula $Li_2Mn_3MO_8$ (wherein M is one or more selected from the group consisting of Fe, Co, Ni, Cu, or Zn); $LiMn_2O_4$ in which a part of Li in the formula is substituted with an alkaline earth metal ion, and the like, but the positive electrode active material is not limited thereto.

The positive electrode may be a Li-metal.

Preferably, the positive electrode active material may be a lithium nickel-cobalt-based oxide represented by Formula 3 below.

$$Li_{1+f}Ni_xCo_yM3_zM4_wO_2$$ [Formula 3]

In Formula 3 above, M3 may be one or more of Mn or Al, and M4 may be one or more selected from the group consisting of Al, Mg, Ti, W, Zr, V, Fe, Y, and Mo.

1+f is the atomic ratio of lithium in the lithium nickel-cobalt-based oxide, wherein the f may satisfy $0 \leq f \leq 0.2$, or $0 \leq f \leq 0.1$.

x is the atomic ratio of nickel among transition metals in the lithium nickel-cobalt-based oxide, wherein the x may satisfy $0<x<1$, $0.3 \leq x<1$, $0.6 \leq x<1$, $0.8 \leq x<1$, or $0.9 \leq x<1$.

y is the atomic ratio of cobalt among transition metals in the lithium nickel-cobalt-based oxide, wherein the y may satisfy $0<y<1$, $0<y<0.7$, $0<y<0.4$, $0<y<0.2$, or $0<y<0.1$.

z is the atomic ratio of M3 among transition metals in the lithium nickel-cobalt-based oxide, wherein the z may satisfy $0<z<1$, $0<z<0.7$, $0<z<0.4$, $0<z<0.2$, or $0<z<0.1$.

w is an atomic ratio of M4 among transition metals in the lithium nickel-cobalt-based oxide, wherein the w may satisfy $0 \leq w \leq 0.1$ or $0 \leq w \leq 0.05$.

More preferably, the positive electrode active material may be a lithium nickel-cobalt-manganese-aluminum oxide represented by Formula 4 below.

$$Li_{1+f1}Ni_{x1}Co_{y1}Mn_{z1}Al_{z2}M4_{w1}O_2$$ [Formula 4]

In Formula 4 above, M4 may be one or more selected from the group consisting of Mg, Ti, W, Zr, V, Fe, Y, and Mo.

1+f1 is the atomic ratio of lithium in the lithium nickel-cobalt-manganese-aluminum oxide, wherein the f may satisfy $0 \leq f1 \leq 0.2$, or $0 \leq f1 \leq 0.1$.

x1 is the atomic ratio of nickel among transition metals in the lithium nickel-cobalt-manganese-aluminum oxide, wherein the x1 may satisfy $0.8 \leq x1 < 1$, $0.85 \leq x1 < 1$, or $0.9 \leq x1 < 1$.

y1 is the atomic ratio of cobalt among transition metals in the lithium nickel-cobalt-manganese-aluminum oxide, wherein the y1 may satisfy $0 < y1 < 0.2$, $0 < y1 < 0.1$, or $0 < y1 \leq 0.05$.

z1 is the atomic ratio of Mn among transition metals in the lithium nickel-cobalt-manganese-aluminum oxide, wherein the z1 may satisfy $0 < z1 < 0.2$, $0 < z1 < 0.1$, or $0 < z1 \leq 0.05$.

z2 is the atomic ratio of Al among transition metals in the lithium nickel-cobalt-manganese-aluminum oxide, wherein the z2 may satisfy $0 < z2 < 0.2$, $0 < z2 < 0.1$, or $< z2 \leq 0.05$.

w1 is the atomic ratio of M4 among transition metals in the lithium nickel-cobalt-manganese-aluminum oxide, wherein the w1 may satisfy $0 \leq w1 \leq 0.1$, $0 \leq w1 \leq 0.05$, or $0 \leq w1 \leq 0.02$.

Meanwhile, the crystal structure of the positive electrode active material may be changed by the intercalation and de-intercalation of lithium ions during charging and discharging. For example, the positive electrode active material of Formula 3 above or Formula 4 above has a hexagonal crystal structure before charging. However, after charging and discharging, the crystal structure thereof is changed to a monoclinic structure due to the intercalation and de-intercalation of lithium ions. When the positive electrode active material of Formula 3 or Formula 4 which transforms into a monoclinic structure during charging and discharging is used, the crystal structure of the positive electrode active material and the crystal structure of the irreversible additive are changed to a monoclinic one, so that the diffusion rate of lithium ions during a process of intercalation and de-intercalation of the lithium ions is maintained constant, so that there may be an effect of more easily overcoming an irreversible capacity.

The contents of the positive electrode active material and the irreversible additive included in the positive electrode material are not particularly limited. Preferably, the irreversible additive may be included in a content which may suppress an irreversible capacity of a negative electrode while not decreasing the energy density of a secondary battery.

For example, when the positive electrode active material represented by Formula 3 or Formula 4 described above is used as a positive electrode active material, and a silicon-based negative electrode is used as a negative electrode, the content of an irreversible additive included in a positive electrode material may be 5 to 20 parts by weight, preferably 10 to 15 parts by weight based on 100 parts by weight of the positive electrode active material. When a positive electrode material including a positive electrode active material and an irreversible additive in the above range is applied to a battery, the problem of an irreversible capacity may be resolved without decreasing the energy density of a secondary battery.

Positive Electrode

In addition, the present invention provides a positive electrode for a lithium secondary battery, the positive electrode including a positive electrode material produced by the method described above.

Specifically, the positive electrode includes a positive electrode current collector and a positive electrode material layer formed on at least one surface of the positive electrode current collector and including the above-described positive electrode material.

The positive electrode current collector is not particularly limited as long as it has conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on the surface of the positive electrode current collector to improve the adhesion force of a positive electrode material. For example, the positive electrode current collector may be used in various forms such as a film, a sheet, a foil, a net, a porous body, a foam, and a non-woven body.

The positive electrode material layer may include a conductive material and a binder, together with a positive electrode material.

At this time, the positive electrode material may be included in an amount of 80-99 wt %, more specifically 85-98 wt % based on the total weight of the positive electrode material layer. When included in the above content range, excellent capacity properties may be exhibited.

At this time, the conductive material is used to impart conductivity to an electrode, and any conductive material may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as a titanium oxide; or a conductive polymer such as a polyphenylene derivative, and any one thereof or a mixture of two or more thereof may be used. The conductive material may be included in an amount of 1 to 30 wt % based on the total weight of the positive electrode material layer.

The binder serves to improve the bonding between positive electrode material particles and the adhesion between the positive electrode material and the current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1 to 30 wt % based on the total weight of the positive electrode material layer.

The positive electrode may be manufactured according to a typical method for manufacturing a positive electrode except that the positive electrode material described above is used. Specifically, the positive electrode may be manufactured by applying a composition for forming a positive electrode material layer, which is prepared by dissolving or dispersing the positive electrode material described above and selectively, a binder and a conductive material in a solvent, on a positive electrode current collector, followed by drying and roll-pressing. At this time, the type and content of the positive electrode material, the binder, and the conductive material are as described above.

The solvent may be a solvent commonly used in the art, and may be dimethyl sulfoxide (DMSO), isopropyl alcohol, N-methylpyrrolidone (NMP), acetone, water, or the like. Any one thereof or a mixture of two or more thereof may be used. The amount of the solvent to be used is sufficient if the solvent may dissolve and disperse the positive electrode material, the binder, and the conductive material in consideration of the applying thickness of a slurry and preparation yield, and thereafter, have a viscosity which may exhibit excellent thickness uniformity during application for manufacturing a positive electrode.

In addition, in another method, the positive electrode may be manufactured by casting the composition for forming a positive electrode material layer on a separate support and then laminating a film obtained by being peeled off from the support on a positive electrode current collector.

Lithium Secondary Battery

In addition, the present invention may manufacture an electrochemical device including the positive electrode. The electrochemical device may be specifically a battery, a capacitor, or the like, and more specifically, may be a lithium secondary battery.

Specifically, the lithium secondary battery includes a positive electrode, a negative electrode positioned to face the positive electrode, a separator interposed between the positive electrode and the negative electrode, and an electrolyte. The positive electrode is the same as that described above, and thus, a detailed description thereof will be omitted. Hereinafter, only the rest of the components will be described in detail.

Also, the lithium secondary battery may selectively further include a battery case for accommodating an electrode assembly composed of the positive electrode, the negative electrode, and the separator, and a sealing member for sealing the battery case.

In the lithium secondary battery, the negative electrode includes a negative electrode current collector and a negative electrode active material layer positioned on the negative electrode current collector.

The negative electrode current collector is not particularly limited as long as it has a high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode current collector may typically have a thickness of 3 μm to 500 μm, and as in the case of the positive electrode current collector, microscopic irregularities may be formed on the surface of the negative electrode current collector to improve the adhesion of a negative electrode active material. For example, the negative electrode current collector may be used in various forms such as a film, a sheet, a foil, a net, a porous body, a foam, and a non-woven body.

The negative electrode active material layer selectively includes a binder and a conductive material in addition to a negative electrode active material.

As the negative electrode active material, a compound capable of reversible intercalation and de-intercalation of lithium may be used. Specific examples thereof may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, an Si alloy, an Sn alloy, or an Al alloy; a metal oxide which may be doped and undoped with lithium such as $SiO_\beta$ ($0<\beta<2$), $SnO_2$, a vanadium oxide, and a lithium vanadium oxide; or a composite including the metallic compound and the carbonaceous material such as an Si—C composite or an Sn—C composite, and any one thereof or a mixture of two or more thereof may be used. Also, a metal lithium thin film may be used as the negative electrode active material. Furthermore, low crystalline carbon, high crystalline carbon and the like may all be used as a carbon material. Representative examples of the low crystalline carbon may include soft carbon and hard carbon, and representative examples of the high crystalline carbon may include irregular, planar, flaky, spherical, or fibrous natural graphite or artificial graphite, Kish graphite, pyrolytic carbon, mesophase pitch-based carbon fiber, mesocarbon microbeads, mesophase pitches, and high-temperature sintered carbon such as petroleum or coal tar pitch derived cokes. In order to achieve the implementation of a high-capacity secondary battery, it is preferable to use a negative electrode including a silicon-based negative electrode active material as the negative electrode.

For example, when the negative electrode includes a silicon-based negative electrode active material, the implementation of a high-capacity secondary battery may be achieved, but due to a high irreversible capacity of the silicon-based negative electrode active material, there is a disadvantage in that the energy density of the secondary battery is rather lowered.

Therefore, in the present invention, an irreversible additive described above is included in a positive electrode for a secondary battery, and thus, lithium ions included in the irreversible additive move to a negative electrode during initial charging, resulting in the pre-lithiation of the negative electrode, so that the irreversible capacity of the negative electrode may be lowered.

The negative electrode active material may be included in an amount of 80 parts by weight to 99 parts by weight based on a total weight of 100 part by weight of a negative electrode active material layer.

The binder is a component for assisting in bonding between a conductive material, an active material, and a current collector, and is typically added in an amount of 0.1 parts by weight to 10 parts by weight based on a total weight of 100 parts by weight of a negative electrode active material layer. Examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber, nitrile-butadiene rubber, fluorine rubber, various copolymers thereof, and the like.

The conductive material is a component for further improving the conductivity of a negative electrode active material, and may be added in an amount of 10 parts by weight or less, specifically 5 parts by weight, based on a total weight of 100 parts by weight of the negative electrode active material layer. The conductive material is not particularly limited as long as it has conductivity without causing a chemical change in the battery. For example, graphite such as natural graphite or artificial graphite; carbon black such as acetylene black, Ketjen black, channel black, furnace black, lamp black, and thermal black; conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like may be used.

For example, the negative electrode active material layer may be prepared by applying a negative electrode mixture material, which is prepared by dissolving or dispersing a negative electrode active material and selectively a binder and a conductive material in a solvent, on a negative electrode current collector, followed by drying. Alternatively, the negative electrode active material layer may be prepared by casting the negative electrode mixture material on a separate support, and then laminating a film peeled off from the support on a negative electrode current collector.

The negative electrode active material layer may be prepared by, for example, applying a negative electrode mixture material, which is prepared by dissolving or dispersing a negative electrode active material and selectively a binder and a conductive material in a solvent, on a negative electrode current collector, followed by drying. Alternatively, the negative electrode active material layer may be prepared by casting the negative electrode mixture material on a separate support, and then laminating a film peeled off from the support on a negative electrode current collector.

Meanwhile, in the lithium secondary battery, a separator is to separate the negative electrode and the positive electrode and to provide a movement path for lithium ions. Any separator may be used without particular limitation as long as it is typically used as a separator in a lithium secondary battery. Particularly, a separator having high moisture-retention ability for an electrolyte as well as low resistance to the movement of electrolyte ions is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, polyethylene terephthalate fiber, or the like may be used. Also, a coated separator including a ceramic component or a polymer material may be used to secure heat resistance or mechanical strength, and may be selectively used in a single-layered or a multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, a molten-type inorganic electrolyte, and the like, all of which may be used in the manufacturing of a lithium secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used. Among these solvents, a carbonate-based solvent is preferable, and a mixture of a cyclic carbonate (e.g., ethylene carbonate or propylene carbonate) having a high ionic conductivity and a high dielectric constant and a linear carbonate-based compound having a low viscosity (e.g., ethylmethyl carbonate, dimethyl carbonate, or diethyl carbonate), the mixture which may increase charging/discharging performance of a battery, is more preferable. In this case, the performance of the electrolyte solution may be excellent when the cyclic carbonate and the chain carbonate are mixed in a volume ratio of about 1:1 to about 1:9.

Any compound may be used as the lithium salt without particular limitation as long as it may provide lithium ions used in a lithium secondary battery. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used. The lithium salt may be used in a concentration range of 0.1 M to 2.0 M. When the concentration of the lithium salt is in the above range, the electrolyte has suitable conductivity and viscosity, thereby exhibiting excellent performance, and lithium ions may effectively move.

In the electrolyte, in order to improve the lifespan properties of a battery, suppress the decrease in battery capacity, and improve the discharge capacity of the battery, one or more kinds of additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and the like may be further included. At this time, the additive may be included in an amount of 0.1 to 5 parts by weight based on a total weight of 100 parts by weight of the electrolyte.

The lithium secondary battery including the positive electrode material according to the present invention as describe above stably exhibits excellent discharging capacity, output properties, and lifespan properties, and thus, are useful for portable devices such as a mobile phone, a notebook computer, and a digital camera, and in the field of electric cars such as a hybrid electric vehicle (HEV).

Accordingly, according to another embodiment of the present invention, a battery module including the lithium secondary battery as a unit cell, and a battery pack including the same are provided.

The battery module or the battery pack may be used as a power source of one or more medium-and-large-sized devices, for example, a power tool, an electric car such as an electric vehicle (EV), a hybrid electric vehicle (HEV), and a plug-in hybrid electric vehicle (PHEV), or a power storage system.

The external shape of the lithium secondary battery of the present invention is not particularly limited, but may be a cylindrical shape using a can, a square shape, a pouch shape, a coin shape, or the like.

The lithium secondary battery according to the present invention may be used in a battery cell which is used as a power source for a small-sized device, and may also be preferably used as a unit cell for a medium- and large-sized battery module including a plurality of battery cells.

MODE FOR CARRYING OUT THE INVENTION

Hereinafter, the present invention will be described in detail with reference to embodiments. However, the embodiments according to the present invention may be modified into other various forms, and the scope of the present invention should not be construed as being limited to the embodiments described below. The embodiments of the present invention are provided to more fully describe the present invention to those skilled in the art.

Example 1

A mixture of lithium, which includes LiNiO$_2$ and 1.5 M of Li, and benzophenone was mixed with tetrahydrofuran (THF), and then was reacted for one day in an inert atmosphere. Next, the obtained mixture was filtered and dried. Thereafter, the filtered and dried mixture was washed with THF, and then dried in vacuum to obtain powder in which a trigonal Li$_2$NiO$_2$ and LiNiO$_2$ were mixed. Next, the powder was dried for 14 hours at 225° C., and then heat treated in a helium atmosphere to obtain Li$_2$NiO$_2$ powder having a trigonal structure with improved crystallinity.

Next, Fe$_2$O$_3$ and LiOH·H$_2$O were mixed at a weight ratio of 1:1, and then fired for 20 hours at 850° C. in a nitrogen atmosphere to obtain Li$_5$FeO$_4$ having an orthorhombic structure.

The Li$_2$NiO$_2$ and Li$_5$FeO$_4$ obtained above were dry mixed at a ratio of 10:1, and then heat treated for 4 hours at 300° C. to perform coating such that Li$_5$FeO$_4$ is 2 parts by weight based on 100 parts by weight of Li$_2$NiO$_2$ on the surface of Li$_2$NiO$_2$, so as to prepare an irreversible additive.

Comparative Example 1

Commercially available Li$_2$NiO$_2$ powder (POSCO, LNO_DN20) having an orthorhombic structure was prepared as an irreversible additive.

Comparative Example 2

Li$_2$NiO$_2$ powder having a trigonal structure was prepared in the same manner as in Example 1 except that Li$_5$FeO$_4$ was not coated, and prepared as an irreversible additive.

Experimental Example 1: X-Ray Diffraction (XRD) Pattern Measurement

Figure 3:
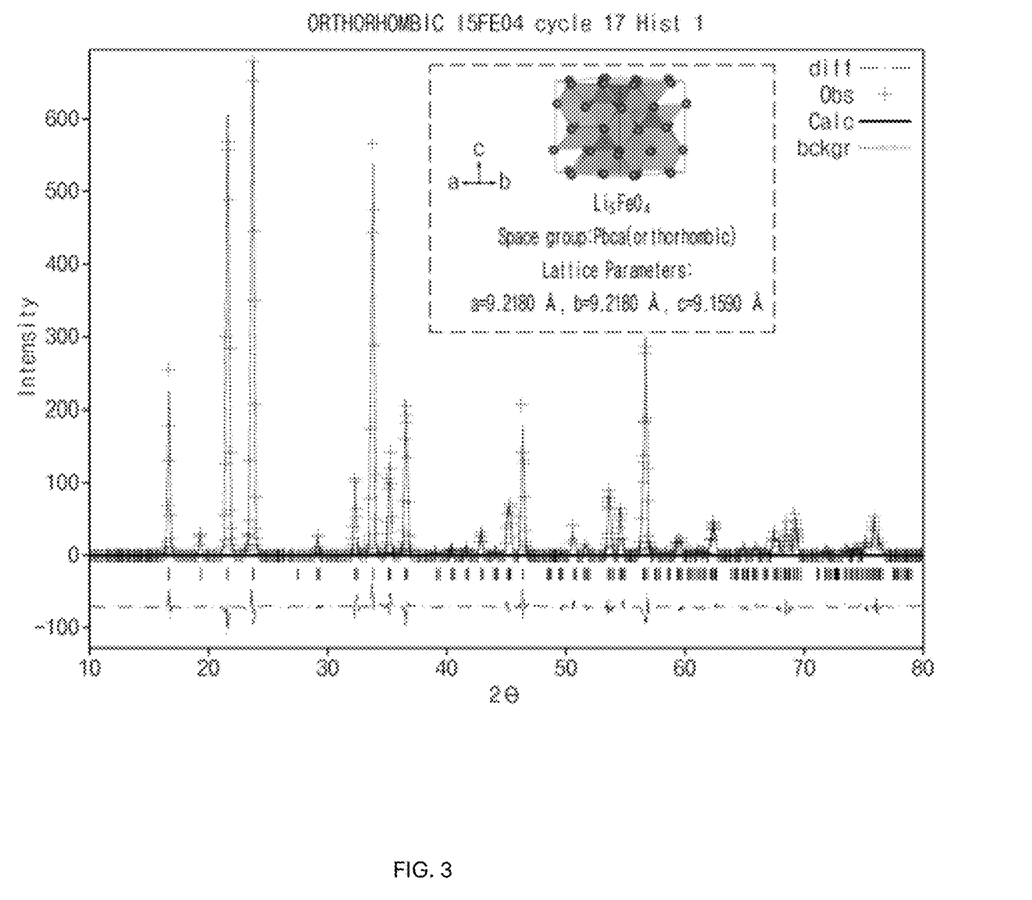
FIG. 3 is a view illustrating an X-Ray Diffraction (XRD) pattern of Li2NiO2 powder prepared in Example 1.
Figure 4:
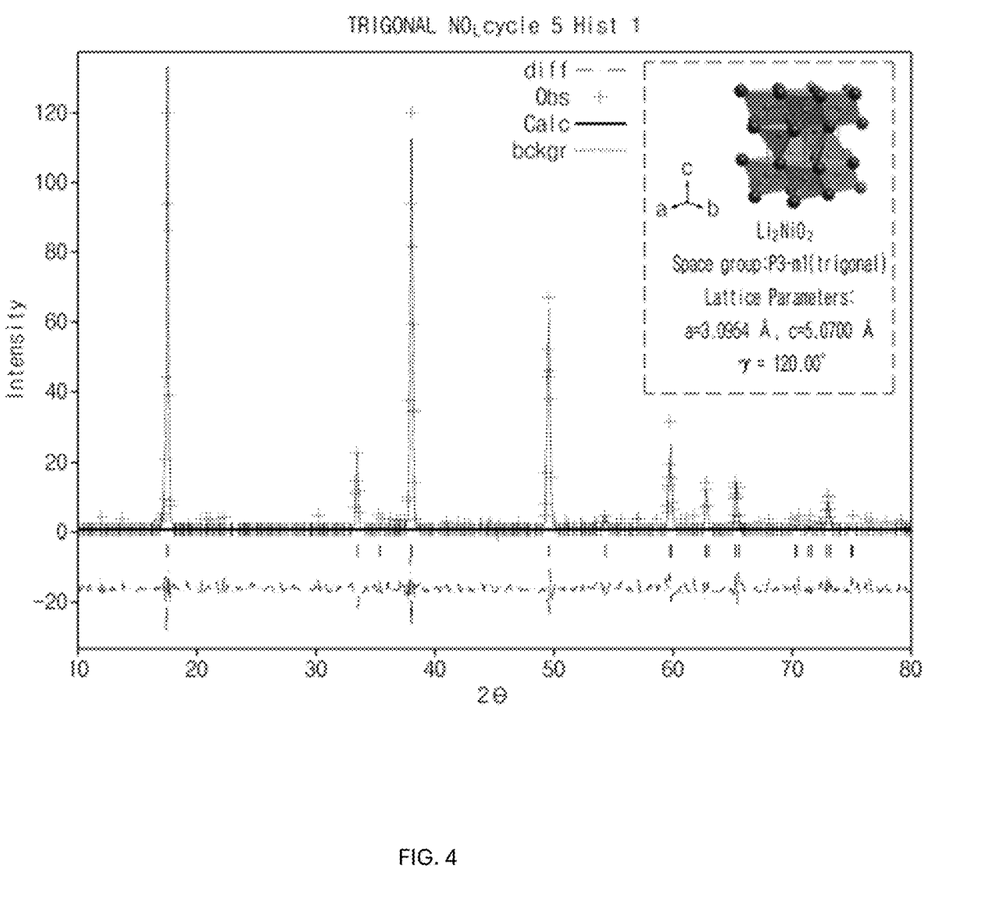
FIG. 4 is a view illustrating an X-Ray Diffraction (XRD) pattern of Li5FeO4 powder prepared in Example 1.

An XRD measurement was performed using a Cu-Kα ray for the Li$_2$NiO$_2$ powder and Li$_5$FeO$_4$ powder prepared in Example 1, and the analysis results are shown in FIG. 3 and FIG. 4, respectively.

Figure 5:
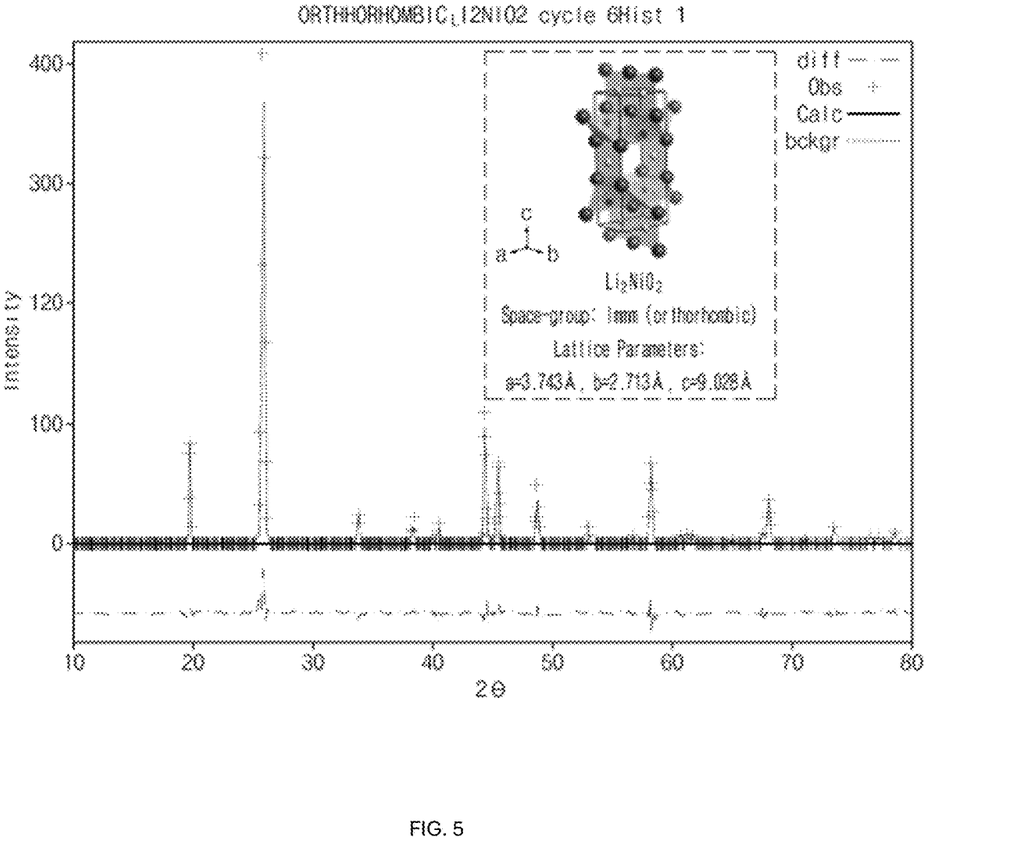
FIG. 5 is a view illustrating an X-Ray Diffraction (XRD) pattern of Li2NiO2 powder prepared as an irreversible additive in Comparative Example 1.

In addition, an XRD measurement was performed using a Cu-Kα ray for the Li$_2$NiO$_2$ powder of Comparative Example 1, and the analysis results are shown in FIG. 5.

Through the XRD patterns illustrated in FIG. 3 and FIG. 4, it can be confirmed that the Li$_2$NiO$_2$ powder prepared in Example 1 has a peak corresponding to a trigonal structure, and the Li$_5$FeO$_4$ powder prepared in Example 1 has a peak corresponding to an orthorhombic structure.

In addition, through FIG. 5, it can be confirmed that the Li$_2$NiO$_2$ powder of Comparative Example 1 has a peak corresponding to an orthorhombic structure.

Experimental Example 2: Oxygen Formation Energy Measurement

The oxygen formation energy of each of the irreversible additives of Example 1 and Comparative Examples 1 and 2 was confirmed. Specifically, using a Vienna Ab-initio simulation package (VASP) program, a density functional theory (DFT) calculation method was applied to calculate oxygen formation energy according to changes in crystal structure, and the calculation results are shown in Table 1 below. At this time, the oxygen formation energy was calculated under the following conditions, based on the density functional theory (DFT), and PBE functional PAW_PBE pseudopotential.

Cut-off energy: 520 eV, Calculation model: A super cell with Li$_{40}$Fe$_8$O$_{32}$ atoms, Oxygen vacancy (Vo) generation concentration=1/32(~3.13 at. %), based on calculated values for O$_2$ gas (O-rich environment).

TABLE 1

| | Structure | Oxygen formation energy($V_0$) (eV) |
|---|---|---|
| Example 1 | Li$_2$NiO$_2$(p3m1)/Li$_5$FeO$_4$/O[1] | 5.01 |
| | Li$_2$NiO$_2$(p3m1)/Li$_5$FeO$_4$/O[2] | 4.72 |
| | Li$_2$NiO$_2$(p3m1)/Li$_5$FeO$_4$/O[3] | 4.90 |
| | Li$_2$NiO$_2$(p3m1)/Li$_5$FeO$_4$/O[4] | 4.72 |
| Comparative Example 1 | Li$_2$NiO$_2$ (Immm) | 4.56 |
| Comparative Example 2 | Li$_2$NiO$_2$ (p3m1) | 4.21 |

The oxygen formation energy is a calculated value of energy required to remove one oxygen, and it can be determined that the higher the oxygen formation energy, the more stable the structure. As shown in Table 1 above, the irreversible additive of Example 1 prepared by coating a trigonal lithium nickel oxide with Li$_5$FeO$_4$ has a higher oxygen formation energy than the irreversible additive of Comparative Example 1 made of an orthorhombic lithium nickel oxide, and the irreversible additive of Comparative Example 2 made of a trigonal lithium nickel oxide without a coating layer, which shows that the irreversible additive of Example 1 has more excellent structural stability than the irreversible additives of Comparative Examples 1 and 2.

The invention claimed is:

1. An additive comprising:
   a lithium nickel oxide having a trigonal crystal structure and represented by Formula 1 below; and
   a coating layer positioned on a surface of the lithium nickel oxide represented by Formula 1 and including a compound represented by Formula 2 below:

wherein in Formula 1 above,
   0≤a≤0.2, 0≤b≤0.5, and 0≤c≤0.2, and M1 is one or more selected from the group consisting of Cu, Mg, Pt, Al, Co, P, and B, wherein in Formula 2 above,
   0≤c≤0.2 and 0≤d≤0.5, and A is one or more selected from the group consisting of F, Cl, Br, I, At, and S.

2. The additive of claim 1, wherein a space group of the lithium nickel oxide represented by Formula 1 above belongs to P3-m1.

3. The additive of claim 1, wherein the lithium nickel oxide represented by Formula 1 above comprises lithium and nickel in a molar ratio of 1.5 to 2:1.

4. The additive of claim 1, wherein the lithium nickel oxide represented by Formula 1 above is Li$_2$NiO$_2$.

5. The additive of claim 1, wherein the compound represented by Formula 2 has an orthorhombic crystal structure.

6. The additive of claim 1, wherein the compound represented by Formula 2 above is Li$_5$FeO$_4$.

7. The additive of claim 1, wherein the compound represented by Formula 2 above is included in an amount from 1 to 10 parts by weight based on 100 parts by weight of the lithium nickel oxide represented by Formula 1 above.

8. A positive electrode material comprising the additive according to claim 1 and a positive electrode active material.

9. The positive electrode material of claim 8, wherein the positive electrode active material is represented by [Formula 3] below:

$$Li_{1+f}Ni_xCo_yM3_zM4_wO_2,\quad \text{[Formula 3]}$$

wherein in Formula 3 above, $0\leq f\leq 0.2$, $0<x<1$, $0<y<1$, $0<z<1$, and $0\leq w\leq 0.1$, M3 is one or more of Mn or Al, and M4 is one or more selected from the group consisting of Al, Mg, Ti, W, Zr, V, Fe, Y, and Mo.

10. The positive electrode material of claim 8, wherein the positive electrode active material is represented by [Formula 4] below:

$$Li_{1+f1}Ni_{x1}Co_{y1}Mn_{z1}Al_{z2}M4_{w1}O_2,\quad \text{[Formula 4]}$$

wherein in Formula 4 above, $0\leq f1\leq 0.2$, $0.8\leq x1<1$, $0<y1<0.2$, $0<z1<0.2$, $0<z2<0.2$, and $0\leq w1\leq 0.1$, and M4 is one or more selected from the group consisting of Mg, Ti, W, Zr, V, Fe, Y, and Mo.

11. The positive electrode material of claim 8, wherein the additive is included in an amount from 5 to 20 parts by weight based on 100 parts by weight of the positive electrode active material.

12. A lithium secondary battery comprising:
a positive electrode including the positive electrode material of claim 8;
a negative electrode positioned to face the positive electrode; and
an electrolyte.

13. The lithium secondary battery of claim 12, wherein the negative electrode comprises a silicon-based negative electrode active material.

14. The lithium secondary battery of claim 12, further comprising a separator interposed between the positive electrode and the negative electrode.

15. The additive of claim 1, wherein the additive has an oxygen formation energy value that is above 4.7 eV.

* * * * *